(12) United States Patent
Bivens

(10) Patent No.: US 6,976,519 B2
(45) Date of Patent: Dec. 20, 2005

(54) PORTABLE CURING SYSTEM FOR USE WITH VACUUM BAG REPAIRS AND THE LIKE

(75) Inventor: Brad Bivens, Ashville, OH (US)

(73) Assignee: BH Thermal, Inc., Columbus, OH (US)

(*) Notice: Subject to any disclaimer, the term of this patent is extended or adjusted under 35 U.S.C. 154(b) by 0 days.

(21) Appl. No.: 10/733,870

(22) Filed: Dec. 11, 2003

(65) Prior Publication Data

US 2004/0177928 A1 Sep. 16, 2004

Related U.S. Application Data

(60) Provisional application No. 60/432,625, filed on Dec. 11, 2002.

(51) Int. Cl.$^7$ ............................ B32B 31/26; B32B 35/00
(52) U.S. Cl. ........................ 156/351; 156/358; 156/359; 156/379; 156/381
(58) Field of Search ............................ 156/94, 98, 351, 156/358, 359, 360, 378, 379, 381; 29/402.01, 402.21; 264/36.1, 36.7; 219/86.21, 386, 533; 392/313

(56) References Cited

U.S. PATENT DOCUMENTS

| | | | |
|---|---|---|---|
| 5,837,968 A | * | 11/1998 | Rohrberg et al. ........ 219/130.1 |
| 6,018,614 A | * | 1/2000 | Garcia et al. ............... 392/383 |
| 6,270,603 B1 | * | 8/2001 | Westerman et al. ........... 156/94 |

* cited by examiner

Primary Examiner—George Koch
(74) Attorney, Agent, or Firm—Porter Wright Morris & Arthur, LLP

(57) ABSTRACT

A portable curing system includes a carrying case, a controller located within the carrying case and having a microprocessor, a vacuum pump located within the case and having at least two vacuum ports for connection of vacuum lines, at least two vacuum sensor connectors for receiving leads of vacuum sensors, at least two heater connectors for receiving leads of electrical heaters, and at least two temperature sensor connectors for receiving leads of thermocouples. The controller is operably connected to the vacuum pump, the vacuum sensor connectors, the heater connectors, and the temperature sensor connectors. A touch-screen video display is mounted within the carrying case and operably connected to the controller to display information from the controller and input information to the controller. The video display is pivotable between a stowed position and a viewing position.

20 Claims, 6 Drawing Sheets

PORTABLE CURING SYSTEM FOR USE WITH VACUUM BAG REPAIRS AND THE LIKE

CROSS-REFERENCE TO RELATED APPLICATIONS

This application claims the priority benefit of U.S. Provisional Patent Application No. 60/432,625, filed on Dec. 11, 2002, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to curing systems or hot bonders for use with vacuum bag or blanket repair systems and, more particularly, to portable curing systems which enable on-site repairs.

BACKGROUND OF THE INVENTION

In many industries, such as the aerospace industry, repairs are made to metal bonded and composite epoxy structures using vacuum bag or blanket repair systems. Curing systems or hot bonders provide and control a vacuum with the bag surrounding the repair site. It is also desired to provide and control a cure temperature at the repair site. See, for example, U.S. Pat. Nos. 6,468,372, 6,373,028, 6,270,603, 6,206,067, 6084,206 for examples of such blanket repair systems, the disclosures of which are expressly incorporated herein in their entireties by reference. When the system is portable, repairs can be made on location such as, for example, right on the vehicle to save manpower and reduce downtime.

While prior systems generally perform their intended purpose, they have difficulty processing new technology composite patches. Accordingly, there is a need in the art for an improved portable curing system or hot bonder.

SUMMARY OF THE INVENTION

In accordance with one aspect of the present invention a portable curing system includes, in combination, a carrying case, a controller located within the carrying case and having a microprocessor, a vacuum pump located within the case and having at least one vacuum port for connection of a vacuum line, at least one heater connector for receiving a lead of an electrical heater, and at least one temperature sensor connector for receiving of a lead of thermocouple. The controller is operably connected to the vacuum pump, the heater connector and the temperature sensor connector. The system also include a touch-screen video display mounted within the carrying case and operably connected to the controller to display information from the controller and to input information to the controller.

According to another aspect of the present invention, a portable curing system includes, in combination, a portable curing system comprises, in combination, a carrying case, a controller located within the carrying case and having a microprocessor, a vacuum pump located within the case and having at least one vacuum port for connection of a vacuum line, at least one heater connector for receiving a lead of an electrical heater, and at least one temperature sensor connector for receiving of a lead of thermocouple. The controller is operably connected to the vacuum pump, the heater connector and the temperature sensor connector. The system further includes a video display mounted within the carrying case and operably connected to the controller to display information from the controller. The video display is pivotable between a stowed position and a viewing position.

According to yet another aspect of the present invention, a portable curing system includes, in combination, a carrying case, a controller located within the carrying case and having a microprocessor, a vacuum pump located within the case and having at least two vacuum ports for connection of vacuum lines, at least two vacuum sensor connectors for receiving leads of vacuum sensors, at least two heater connectors for receiving leads of electrical heaters, and at least two temperature sensor connectors for receiving leads of thermocouples. The controller is operably connected to the vacuum pump, the vacuum sensor connectors, the heater connectors, and the temperature sensor connectors. The system further includes a touch-screen video display mounted within the carrying case and operably connected to the controller to display information from the controller and input information to the controller. The video display is pivotable between a stowed position and a viewing position.

From the foregoing disclosure and the following more detailed description of various preferred embodiments it will be apparent to those skilled in the art that the present invention provides a significant advance in the technology and art of portable curing systems. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
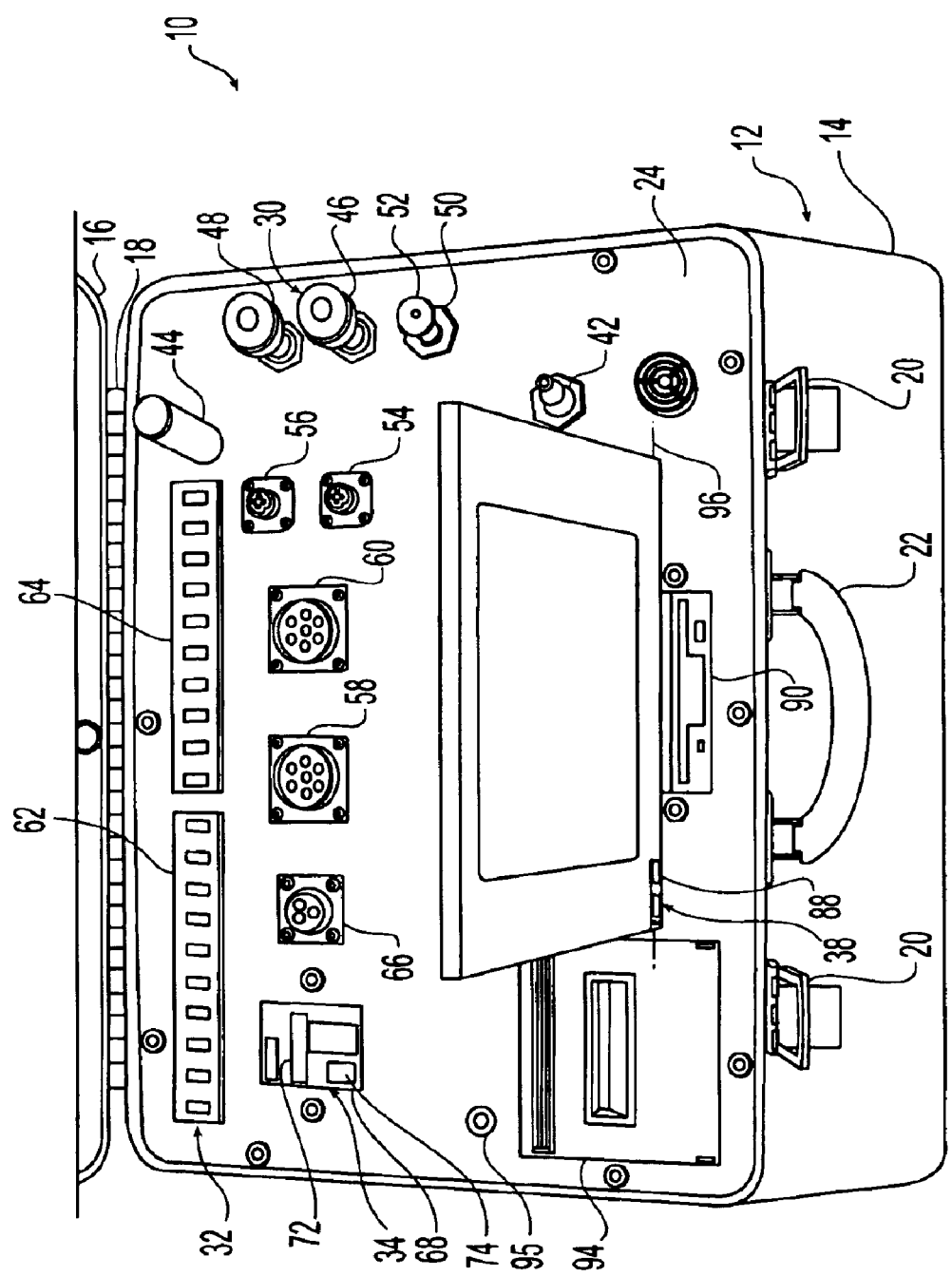
FIG. 1 is a perspective view of a portable curing system according to the present invention.

It should be understood that the appended drawings are not necessarily to scale, presenting a somewhat simplified representation of various preferred features illustrative of the basic principles of the invention. The specific design features of a portable curing system as disclosed herein, including, for example, specific dimensions, orientations, and shapes of the portable curing system components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the portable curing system illustrated in the drawings. In general, up or upward refers to an upward direction within the plane of the paper in FIG. 1, and down or downward refers to a downward direction within the plane of the paper in FIG. 1. Also in general, vertical refers to an upward/downward direction within the plane of the paper in FIG. 1 and horizontal refers to a left/right direction within the plane of the paper in FIG. 1. Further in general, right refers to a rightward direction in FIG. 1 and left refers to a leftward direction in FIG. 1. Moreover in general, front or forward refers a direction out of the plane of the paper in FIG. 1 and rear or rearward refers to a direction into the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved portable curing system or hot bonder disclosed herein. The following detailed discussion of various alternative and preferred embodiments will illustrate the general principles of the invention with reference to a portable curing system for use with a composite patch repair. Other embodiments suitable for other applications will be apparent to those skilled in the art given the benefit of this disclosure.

Referring now to the drawings, FIG. 1 illustrate a portable, self contained curing system or hot bonder 10 according to the present invention for on-site repair of metal bonded and composite epoxy structures. The portable curing system 10 includes a portable carrying case 12 having a main body 14 and a lid 16 hinged to the main body 14. The main body 14 and lid 16 cooperate to form an internal cavity to house and selectively enclose the various components of the curing system 10. The cavity is sized and shaped to self-contain the other components of the curing system 10. The main body 14 is generally rectangular-shaped having a generally flat bottom wall and front, rear and side walls upwardly depending from the bottom wall to a top opening. The lid 16 is sized and shaped for closing the top opening and is secured to the rear wall by at least one hinge 18. The lid 16 hinges between a closed position wherein the lid 16 closes the top opening and seals the cavity and an open position wherein the cavity is accessible through the top opening. A pair of latches 20 are provided on the front wall for releasably securing the lid 16 in its closed position. A handle 22 is also provided in the front wall for manually carrying the carrying case 12. The illustrated carrying case 12 is about 24 inches by about 16 inches by about 8 inches but other suitable shapes and sizes can be utilized. The illustrated carrying case 12 is formed of a metal such as aluminum but any suitable rigid material can alternatively be utilized such as, plastic, fiberglass, or the like.

Figure 2:
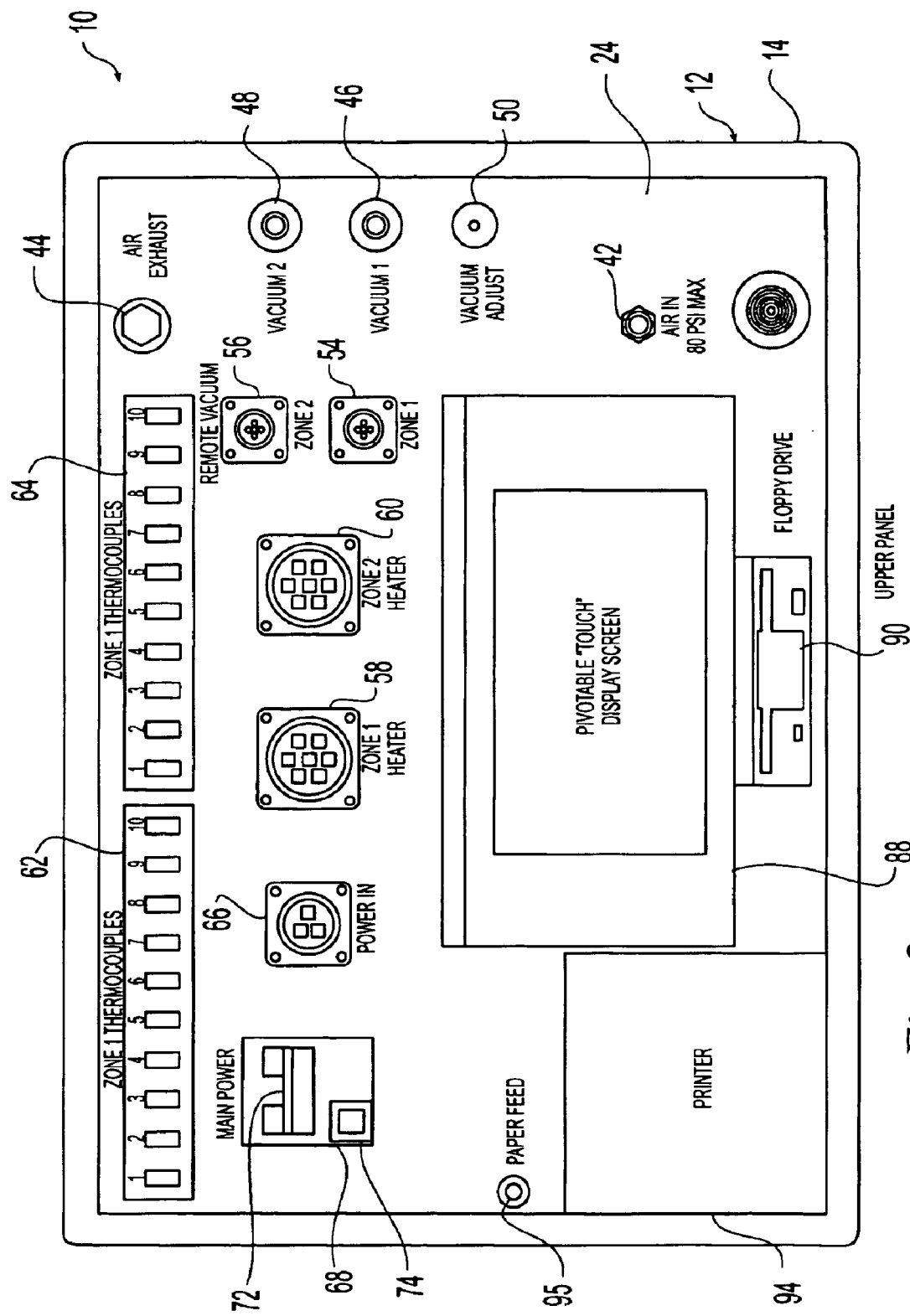
FIG. 2 is a diagrammatic top plan view of an upper panel of the portable curing system of FIG. 1.
Figure 3:
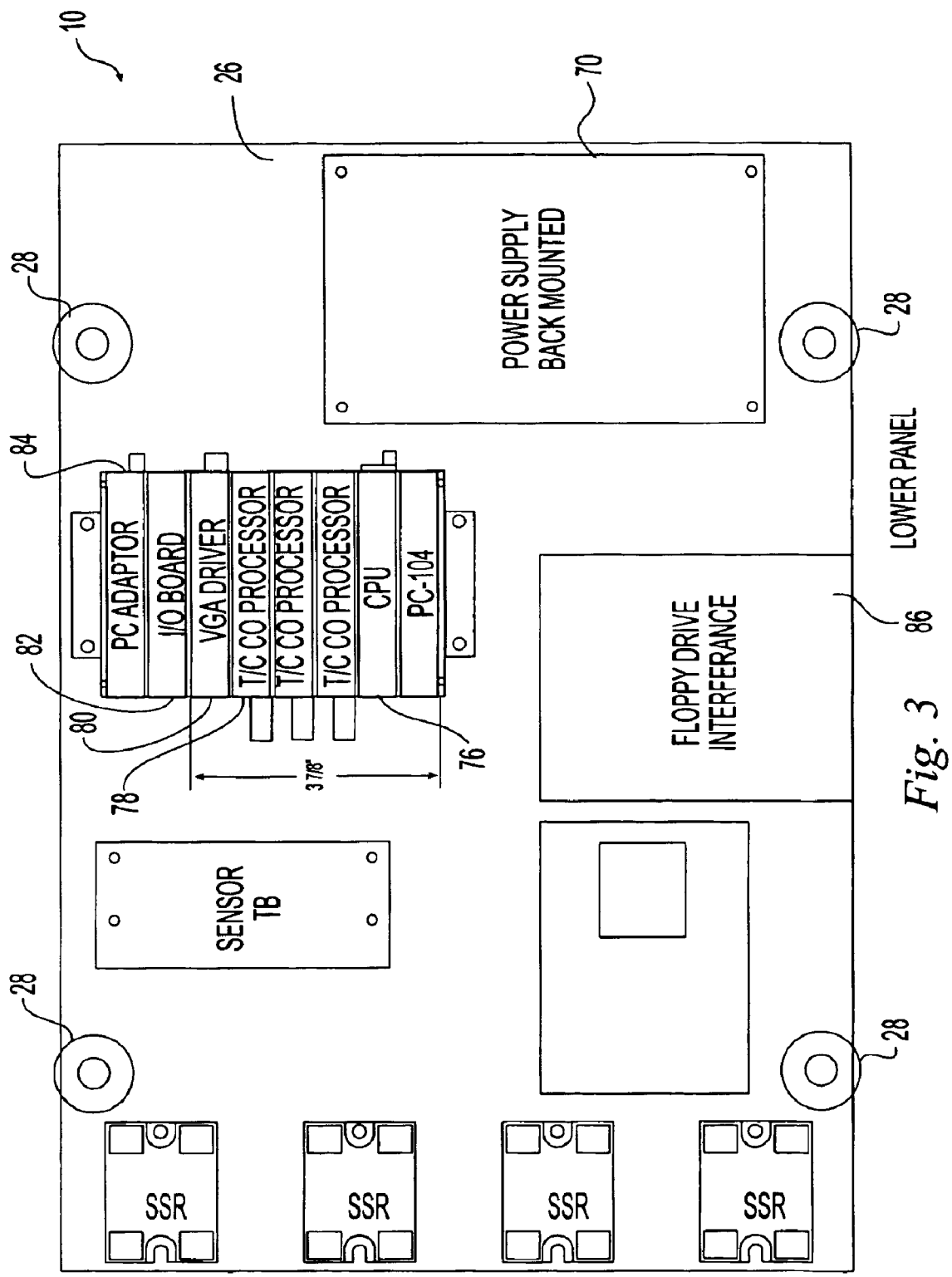
FIG. 3 is a diagrammatic top plan view of a lower panel of the portable curing system of FIGS. 1 and 2.

As best shown in FIGS. 2 and 3, contained within the carrying case 12 are an upper panel 24 visible when the lid 16 is in its open position and a lower panel 26 located in the carrying case 12 below the upper panel 24 and above the bottom wall of the carrying case 12. The upper and lower panels 24, 26 are preferably mounted within the case by shock mounts 28 to reduce shock and/or vibrational loads applied to components secures to the upper and lower panels 24, 26. Also contained within the carrying case 12 is a vacuum system 30, a temperature control system 32, a power system 34, a microprocessor-based controller 36, and input/output devices 38 operably connected to the controller 36.

Figure 4:
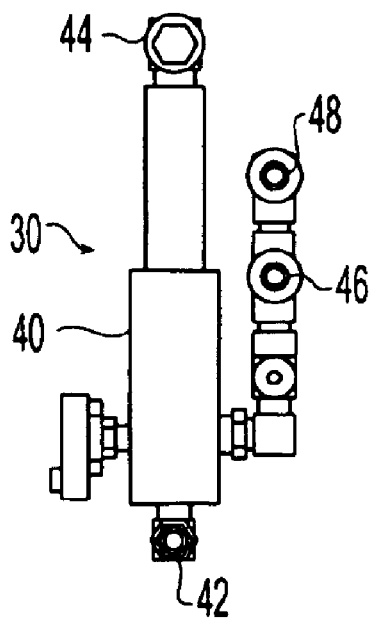
FIG. 4 is top plan view of a vacuum system of the portable curing system of FIGS. 1 to 3 wherein other components are removed for clarity.
Figure 5:
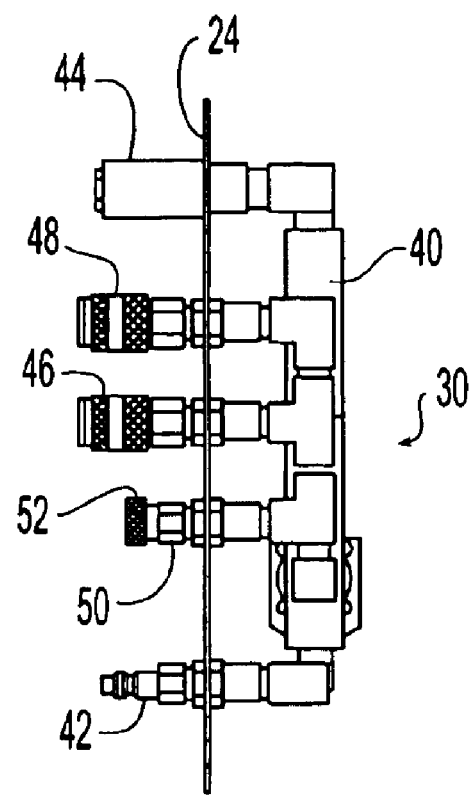
FIG. 5 is a left side elevation view of the vacuum system of FIG. 4 but with the upper panel shown.
Figure 6:
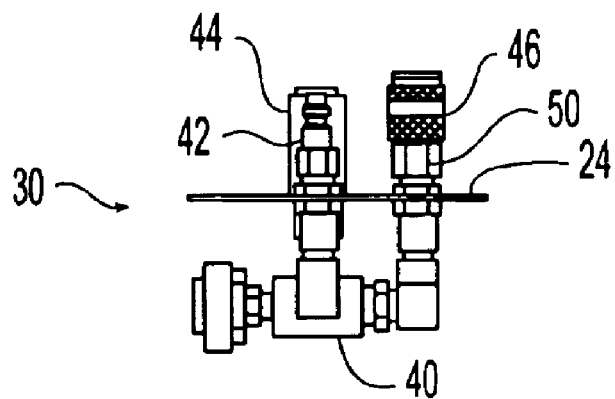
FIG. 6 is a front elevational view of the vacuum system of FIGS. 4 and 5 with the upper panel shown.

As best shown in FIGS. 4 to 6, the illustrated vacuum system 30 includes an internal venturi vacuum pump 40, an air-in or supply port 42, an air-out or exhaust port 44, first and second vacuum ports 46, 48, and a manually operated control valve 50. The illustrated vacuum pump 40 is driven by compressed air to pump fluids to pull a vacuum. It is noted that other suitable types of vacuum pumps can alternatively be utilized such as, for example, an electric vacuum pump. The illustrated vacuum pump 40 is secured to the upper panel 24 below the upper panel 24 and at the right side of the carrying case 12 (as viewed in FIG. 1). The air supply port 42 is connected to an air inlet of the vacuum pump 40 and is adapted for receiving an air input line to connect a source of compressed air to the vacuum pump 40. The illustrated air supply port 42 extends through the upper panel 24 so that an inlet end of the port 42 is located above the upper panel 24 and an outlet end of the port 42 is located below the upper panel 24 at a front end of the vacuum pump 40. Mounted in this manner, the air input line can be easily connected to the port 42 when the lid 16 of the carrying case 12 is in its open position. The air exhaust port 44 is connected to an outlet of the vacuum pump 40 for exhausting fluids from the vacuum pump 40. The illustrated air exhaust port 44 extends through the upper panel 24 so that an outlet end of the port 44 is located above the upper panel 24 and an inlet end of the port 44 is located below the upper panel 24 at a rear end of the vacuum pump 40. Mounted in this manner, air or other fluid can be easily discharged to the surrounding environment when the lid 16 of the carrying case 12 is in its open position. Preferably, the exhaust port 44 is provided with a deflector shield and/or muffler.

The first and second vacuum ports 46, 48 are provided for connection of first and second vacuum lines to connect a vacuum bag, blanket or other device in which a vacuum is to be pulled. The first and second vacuum ports 46, 48 are connected in series to a vacuum inlet of the vacuum pump 40 and are adapted for receiving the vacuum lines. The illustrated first and second vacuum ports 46, 48 extend through the upper panel 24 so that inlet ends of the ports 46, 48 are located above the upper panel 24 and outlet ends of the ports 46, 48 are located below the upper panel 24 at a right side of the vacuum pump 40. Mounted in this manner, the vacuum lines can be easily connected to the ports 46, 48 when the lid 16 of the carrying case 12 is in its open position. The control valve 50 is located between the first and second vacuum ports 46, 48 and the vacuum pump 40 to control the flow of fluids to the vacuum pump 40. The illustrated control valve 50 is provided with an adjustment knob 52 so that the operator can manually adjust the level of vacuum provided through the vacuum lines by the vacuum pump 40. The illustrated control valve 50 extends through the upper panel 24 so that the adjustment knob 52 is located above the upper panel 24 and the valve portion located below the upper panel 24 at a right side of the vacuum pump 40 in the line between the vacuum pump 40 and the vacuum ports 46, 48. Mounted in this manner, the adjustment knob 52 can be easily adjusted when the lid 16 of the carrying case 12 is in its open position. It is noted that the adjustment knob 52 can alternatively be any other suitable operator control device. It is also noted that the illustrated manually-operated control valve 50 can alternatively be a electric or pneumatic-operated control valve or the like.

A first and second vacuum sensor connectors 54, 56 are preferably provided for connecting leads of vacuum sensors which provide signals indicating the vacuum level in the two zones or locations to which the vacuum lines are connected. The illustrated first and second vacuum sensor connectors 54, 56 extend through the upper panel 24 so that plug or inlet ends of the connectors 54, 56 are located above the upper panel 24 and outlet ends of the connectors 54, 56 are located below the upper panel 24 generally to the left of the vacuum pump 40. Below the upper panel 24, the outlet ends of the connectors 54, 56 are suitably connected to the controller 36 as described in more detail hereinafter. Mounted in this manner, the vacuum sensor lines can be easily plugged into the connectors 54, 56 when the lid 16 of the carrying case 12 is in its open position. While the illustrated embodiment is configured with two vacuum ports 46, 48 and two vacuum sensor connectors 54, 56 to pull and control vacuum in two zones or locations, it is noted that the vacuum system 30 can alternatively be configured to pull a vacuum in only one zone or more than two zones by provide one or more than two of the vacuum ports 46, 48 and the vacuum sensor connectors 54, 56.

The temperature control system 32 includes first and second heater connectors 58, 60 and first and second sets of temperature sensor connectors 62, 64. The heater connectors 58, 60 are provided for connecting the leads of a pair of electrical heaters which supply heat to the two zones or locations. The heaters are preferably electrical resistance heaters but can be of any suitable type. The illustrated first and second heater connectors 58, 60 extend through the upper panel 24 so that plug or inlet ends of the connectors 58, 60 are located above the upper panel 24 and outlet ends of the connectors 58, 60 are located below the upper panel 24 generally to the left of vacuum sensor connectors 54, 56. Below the upper panel 24, the outlet ends of the connectors 58, 60 are suitably connected to the controller 36 as described in more detail hereinafter. Mounted in this manner, the heater leads can be easily plugged into the connectors 58, 60 when the lid 16 of the carrying case 12 is in its open position.

The sets of temperature sensor connectors 62, 64 are provided for connecting the leads of temperature sensors such as, for example, thermocouples or any other suitable type of temperature sensor which supply signals indicating temperature in the tow zones or locations being heated. The illustrated embodiment includes ten temperature sensor connectors 62, 64 for each of the temperature sensors in the two zones or locations being heated. It is noted that less than ten or more than ten temperature sensor connectors 62, 64 can be provided for each zone or location being heated. The illustrated temperature connectors 62, 64 are type J thermocouple inputs but any suitable type of input can be utilized. The illustrated sets of temperature sensor connectors 62, 64 extend through the upper panel 24 so that plug or inlet ends of the connectors 62, 64 are located above the upper panel 24 and outlet ends of the connectors 62, 64 are located below the upper panel 24. Below the upper panel 24, the outlet ends of the connectors 62, 64 are suitably connected to the controller 36 as described in more detail hereinafter. Mounted in this manner, the temperature sensor leads can be easily plugged into the connectors 62, 64 when the lid 16 of the carrying case 12 is in its open position. The illustrated temperature sensor connectors 62, 64 are located along the rear edge of the upper panel 24 to the rear of the heater connectors 58, 60. While the illustrated embodiment is configured to control heaters and temperature sensors in the two zones or locations, it is noted that the temperature control system 32 can alternatively be configured to control a single heater and/or temperature sensor in only one zone or more than two heaters and/or temperature sensors in more than two zones or locations.

The power system 34 includes a power-in connector 66, a main power switch 68, and a power supply 70. The power-in connector 66 is provided for receiving a power cord for connecting a suitable power source. The illustrated power-in connector 66 extends through the upper panel 24 so that a plug or inlet end of the connector 66 is located above the upper panel 24 and an outlet end of the connector 66 is located below the upper panel 24. Below the upper panel 24, the outlet end of the connector 66 is suitably connected to the controller 36 as described in more detail hereinafter. Mounted in this manner, the power cord can be easily plugged into the connector 66 when the lid 16 of the carrying case 12 is in its open position. The illustrated power-in connector 66 is located to the left edge of the first heater connector 58 and forward of the first set of temperature sensor connectors 62.

The main power switch 68 is provided so that the operator can manually switch power to the entire curing system 10 on and off as desired. The illustrated main power switch 68 extends through the upper panel 24 so that a throw lever 72 of the switch 68 is located above the upper panel 24 and an outlet end of the switch 68 is located below the upper panel 24. Below the upper panel 24, the outlet end of the switch is suitably connected to the controller 36 as described in more detail hereinafter. Mounted in this manner, the throw lever 72 can be easily operated by the user when the lid 16 of the carrying case 12 is in its open position. The illustrated main power switch 68 is located to the left of the power-in connector along the left edge of the upper panel 24. preferably, the power switch 68 is provided with a test button 74.

The power supply 70 is provided to supply desired power to various electrical components of the curing system 10. The illustrated power supply 70 is back mounted to the lower panel 26 is located at the right side of the lower panel 26. The power supply is operably connected to the controller 36 and the other components. The curing system 10 preferably has an operating voltage of 110/220 VAC, auto-switching, but any suitable operating voltage can be utilized.

The microprocessor-based controller 36 includes processing means and memory means and is operably connected to the vacuum pump 40, the vacuum sensors connectors 54, 56, the heater connectors 58, 60, and the temperature sensor connectors 62, 64 to perform desired function in controlling the vacuum and temperature at the two zones or locations. Preferably, temperatures can be controlled over the range of about 0 degrees Fahrenheit to about 1400 degrees Fahrenheit and temperature ramp rates can be controlled from about 1 degree Fahrenheit/minute to about 36 degrees Fahrenheit/minute. Soak times are preferably selectable from about 0 to about 99.9 hours. The controller 36 is preferably a PID based controller which provides automatic, precisely controlled temperature rise, temperature dwell, dwell intervals, and temperature ramp down. Preferably, there can be fixed point, single, double, or triple ramp operation. The operator can chose to control via highest, lowest, average or specified thermocouple. Preferably, advanced control tuning of PID parameters provides accurate control during soak/dwell. The controller 36 preferably digitally logs all data both during and after a cure cycle. Preferably, data can be logged as fast as once every four seconds. In the event of power failure, the controller 36 preferably retains all status in non-volatile memory. If power returns within a predetermined period of time such as two minutes, the programmed cure cycle resumes at the point where power failed. If power is returned after the predetermined period of time, the cure cycle is aborted. Programs of the controller 36 are preferably password protected.

The illustrated controller 36 includes a central processing unit (CPU) 76, a plurality of thermal couple processors 78, a video driver 80, an input/output (I/O) board 82, and a personal computer (PC) adapter 84. The CPU 76 includes processing and memory means which are programmed to provide the desired functions of the curing system 10. The thermal couple processors 78 are adapted to process the signals from the thermo couples to determine the temperatures in the two zones or locations. The video driver 80 interfaces with the video display to provide desired output on the video display. The illustrated video driver is a VGA driver but alternatively any other suitable video driver can be utilized. The I/O board 82 interfaces with the various input/output devices as described in more detail hereinafter. The PC adapter 84 enables the controller 36 to interface with a personal computer to import or export data or programs. Also provided is a floppy drive interface 86 for interfacing with an internal floppy drive. Each of the illustrated components of the controller 36 are located on the lower panel 26. It is noted that the controller 36 can include any other desired components.

The input/output devices include a video display 88, an internal floppy drive 90, a personal computer (PC) port, and a printer 94. The video display 88 is preferably a full color graphical display which displays any desired information, including programming selections while setting up a cure cycle and current status during operation of a cure cycle, from the controller 36. The video display 88 is also preferably a touch screen which enables the operator to input desired information to the controller 36 by touching appropriate locations on the screen of the video display 88. Preferably, the controller 36 permits the operator to program desired cure cycles and other features and functions via the touch screen video display 88. The illustrated video display 88 is located on the top of the upper panel 24 and forward of the vacuum sensor connectors 54, 56 and the heater connectors 58, 60. Mounted in this manner, the video display 88 can be easily viewed and touched by the user when the lid 16 of the carrying case 12 is in its open position. The video display is suitably connected to the video driver 80 and the controller.

Figure 7:
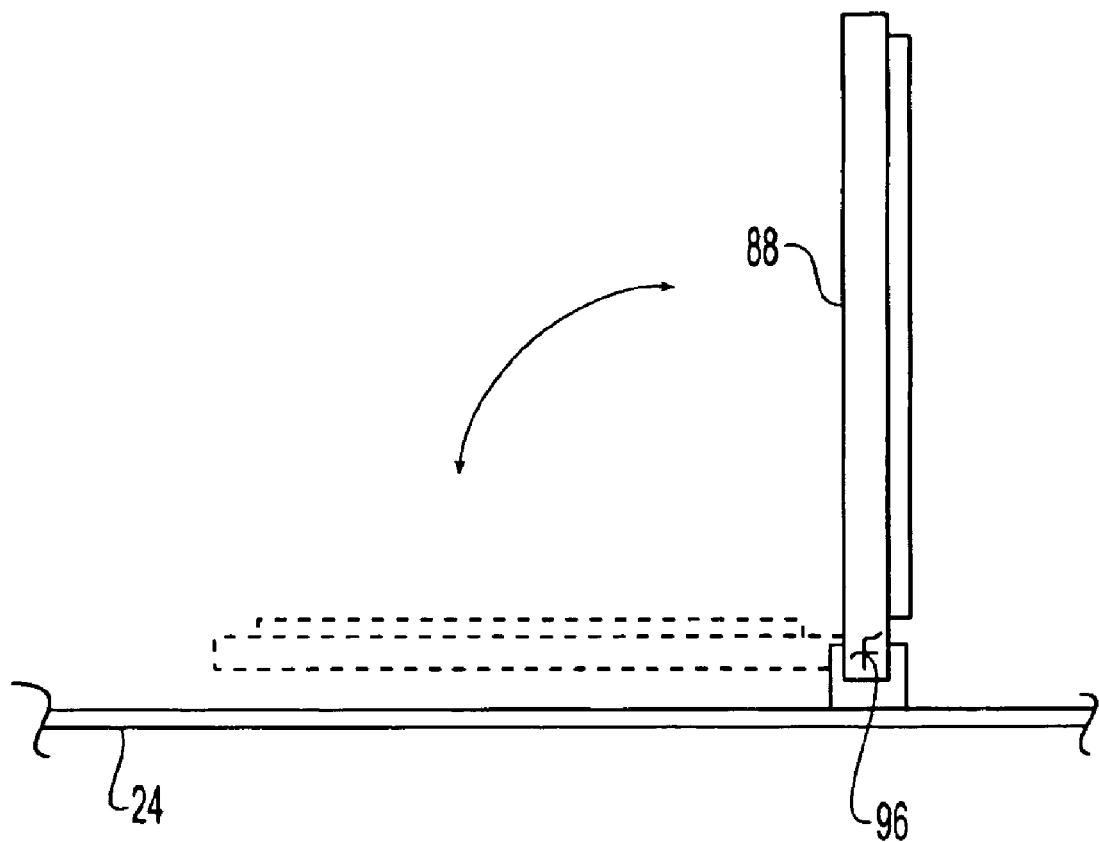
FIG. 7 is a fragmented, enlarged left side elevational view showing a pivotable display of the portable curing system of FIGS. 1 to 6.

As best shown in FIG. 7, the touch-screen video display 88 is preferably pivotably mounted to the upper panel 24 within the carrying case 12 so that the video display 88 is pivotable between a stored position generally parallel to the upper panel 24, with the screen facing upward, and an operational or viewing position generally perpendicular to the upper panel 24, with the screen facing forward. The illustrated video display 88 is pivotable about a generally horizontal and laterally extending pivot axis 96 which is generally parallel to the upper panel 24. The video display preferably pivots at least about ninety degrees. Mounted in this manner, the operator can manually adjust the viewing angle of the video display 88 to a wide variety of viewing angles. The user-adjustable video display 88 also enables a relatively large video display 88 to be utilized yet stored within the carrying case 12 without increasing the size of the carrying case 12.

The internal floppy drive 90 is provided for program and data transfer with the controller 36 by means of magnetically recordable floppy discs or the like. The illustrated internal floppy drive 90 is located on the upper panel 24 and forward of the display 88. Mounted in this manner, the floppy drive 90 can be easily utilized by the user when the lid 16 of the carrying case 12 is in its open position. The internal floppy drive is operably connected to the floppy drive interface 86 and the controller 36.

The PC port 92 is provided for direct connection of a PC or other suitable computer to upload or download programs to the controller 36 or to upload or download cure data from the controller 36. The PC port 92 is suitable connected to the PC adapter 84 and the controller 36. Therefore, information including programs, operation status and post cure information can be saved to or read from disk via the floppy drive 90 or exported to or imported from a PC via the direct PC port 92. It is noted that the curing system 10 can alternatively be provided with means for wirelessly communicating the information to remote locations. It should also be apparent from the above detailed description that the system permits both local and remote monitoring of the vacuum.

The printer 94 is provided for printing cure data output, or other information, for each of the two zones or locations in a single hard copy document. It is noted that any desired information can be printed by the printer 94. The illustrated printer 94 is located at the forward edge of the upper panel 24 and to the left of the video display 88 and the floppy drive 90. The printer 94 is operably connected to the I/O board 82 and the controller 36. Preferably the printer 94 includes a paper feed button 95 for advancing paper in the printer 94.

Preferably visual and/or audible alarms 98, 100 are provided which are triggered in the event of fixed and/or programmed events. Fixed events can be, for example, an open loop thermocouple, a loop break, and/or a power loss. Programmable events can be, for example, a high temperature limit alarm, a high temperature limit shutdown, a low temperature limit alarm, a low temperature limit shutdown, a low vacuum, or a high vacuum. The visual and audible alarms are operably connected to the controller 36.

Figure 8:
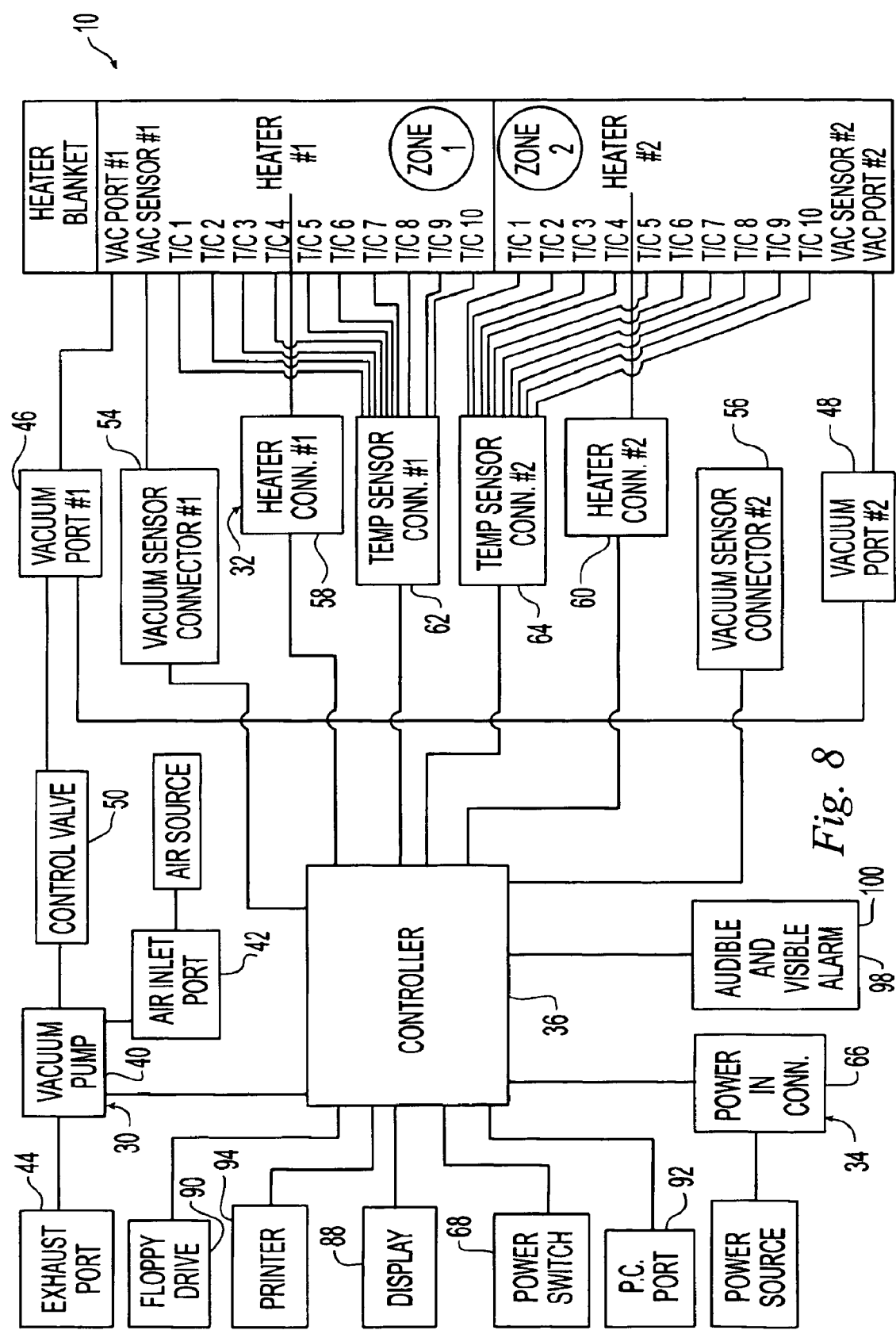
FIG. 8 Is a block diagram schematically showing the curing system of FIGS. 1 to 7.

As best shown in FIG. 8, during use the portable curing system 10 is moved to the site of the repair and is operably connected to the heater bag or blanket or the like or a pair of heater bags or blankets or the like which define a pair of zones or locations to be controlled. The carrying case 12 is positioned at the desired on-site operating location resting on the bottom wall of the carrying case 12. The lid 16 is unlatched and pivoted to its open position so that access to the upper panel 24 is fully provided. The video display 88 is upwardly pivoted to its desired viewing position. The first and second vacuum ports 46, 48 are connected to the two vacuum ports of the heater blanket using the pair of vacuum lines. The first and second vacuum sensor connectors 54, 56 are connected to the two vacuum sensors by the pair of leads. The first and second heater connectors 58, 60 are connected to the pair of heaters by the pair of leads. The first and second sets of temperature sensor connectors 62, 64 are connected to the thermal couples by the twenty leads. The air inlet port 42 is connected to a source of air by an air line. The power-in connector 66 is connected to a power source by a power cord. The operator powers the curing system by manually activating the power switch 68. The operator then activates desired control programs and inputs desired control parameter or information via the touch-screen video display 88, the PC port 92, or the floppy drive 90. The controller 36 then controls the vacuum and temperature in the two zones in the desired manner. The operator can monitor and/or download curing conditions via the video display 88, the floppy drive 90, the PC port 92, or the printer 94. Once completed, cure history data is stored in memory and can be viewed and/or downloaded via the video display 88, the floppy drive 90, the PC port 92, or the printer 94. Once all the connections are removed, the video display screen 88 is downwardly pivoted to its storage position and the lid 16 is downwardly pivoted to its closed position and latched to the main body 14 of the carrying case 12. The portable curing system 10 can then be moved as desired to a new site.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A portable curing system comprising, in combination:
a carrying case;
a controller located within the carrying case and having a microprocessor;
a vacuum pump located within the case and having at least one vacuum port for connection of a vacuum line;
at least one heater connector for receiving a lead of an electrical heater;
at least one temperature sensor connector for receiving of a lead of thermocouple;
wherein the controller is operably connected to the vacuum pump, the heater connector and the temperature sensor connector; and
a touch-screen video display mounted within the carrying case and operably connected to the controller to display information from the controller and to input information to the controller.

2. The portable curing system according to claim 1, wherein the video display is pivotable between a stowed position and a viewing position.

3. The portable curing system according to claim 2, wherein the video display is pivotable at least ninety degrees.

4. The portable curing system according to claim 2, wherein the video display is pivotable about a generally horizontal and pivot axis laterally extending between sides of the carrying case.

5. The portable curing system according to claim 1, wherein the carrying case has main body and a lid hingedly connected to the main body.

6. The portable curing system according to claim 1, wherein the vacuum pump is a venturi vacuum pump.

7. The portable curing system according to claim 1, wherein there are at least two of the heater connectors and at least two of the temperature sensor connectors.

8. The portable curing system according to claim 7, wherein there are at least ten of the temperature sensor connectors associated with each of the heater connectors.

9. The portable curing system according to claim 1, wherein the video display is a full color graphical video display.

10. The portable curing system according to claim 1, further comprising at least one vacuum sensor connector for receiving a lead of a vacuum sensor and operatively connected to the controller.

11. A portable curing system comprising, in combination:
a carrying case;
a controller located within the carrying case and having a microprocessor;
a vacuum pump located within the case and having at least one vacuum port for connection of a vacuum line;
at least one heater connector for receiving a lead of an electrical heater;
at least one temperature sensor connector for receiving of a lead of thermocouple;
wherein the controller is operably connected to the vacuum pump, the heater connector and the temperature sensor connector;
a video display mounted within the carrying case and operably connected to the controller to display information from the controller; and
wherein the video display is pivotable between a stowed position and a viewing position.

12. The portable curing system according to claim 11, wherein the video display is pivotable at least ninety degrees.

13. The portable curing system according to claim 11, wherein the video display is pivotable about a generally horizontal and pivot axis laterally extending between sides of the carrying case.

14. The portable curing system according to claim 11, wherein the carrying case has main body and a lid hingedly connected to the main body.

15. The portable curing system according to claim 11, wherein the vacuum pump is a venturi vacuum pump.

16. The portable curing system according to claim 11, wherein there are at least two of the heater connectors and at least two of the temperature sensor connectors.

17. The portable curing system according to claim 11, wherein there are at least ten of the temperature sensor connectors associated with each of the heater connectors.

18. The portable curing system according to claim 11, wherein the video display is a full color graphical video display.

19. The portable curing system according to claim 11, further comprising at least one vacuum sensor connector for receiving a lead of a vacuum sensor and operatively connected to the controller.

20. A portable curing system comprising, in combination:
a carrying case;
a controller located within the carrying case and having a microprocessor;
a vacuum pump located within the case and having at least two vacuum ports for connection of vacuum lines;
at least two vacuum sensor connectors located within the carrying case for receiving leads of vacuum sensors;
at least two heater connectors located within the carrying case for receiving leads of electrical heaters;
at least two temperature sensor connectors located within the carrying case for receiving leads of thermocouples;
wherein the controller is operably connected to the vacuum pump, the vacuum sensor connectors, the heater connectors, and the temperature sensor connectors;
a touch-screen video display mounted within the carrying case and operably connected to the controller to display information from the controller and input information to the controller; and
wherein the video display is pivotable between a stowed position and a viewing position.

* * * * *